UNITED STATES PATENT OFFICE.

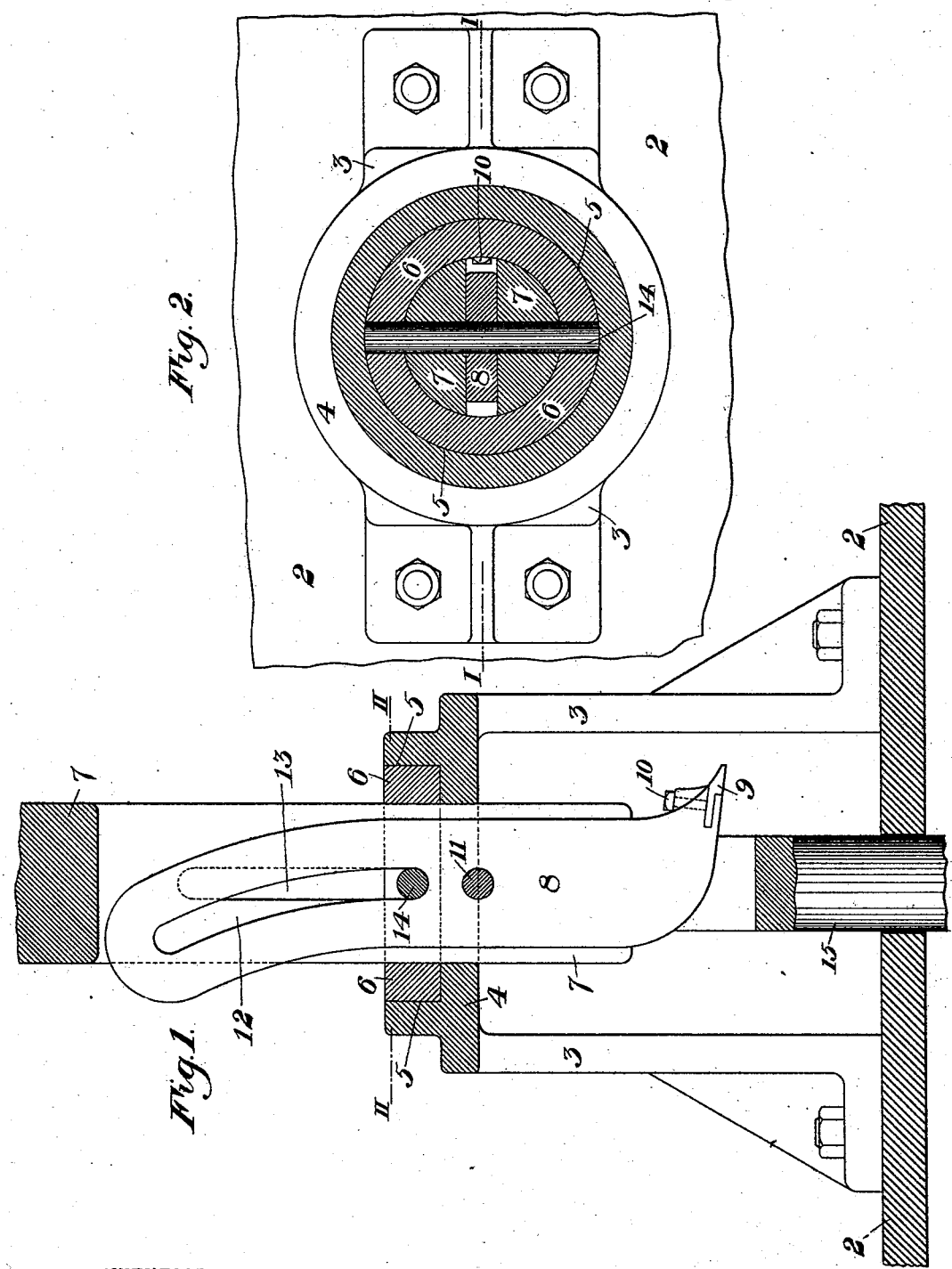

CHARLES E. BLUE, OF WHEELING, WEST VIRGINIA.

BORING-TOOL.

SPECIFICATION forming part of Letters Patent No. 524,375, dated August 14, 1894.

Application filed March 6, 1894. Serial No. 502,523. (No model.)

*To all whom it may concern:*

Be it known that I, CHARLES E. BLUE, of Wheeling, in the county of Ohio and State of West Virginia, have invented a new and useful Improvement in Boring-Tools, of which the following is a full, clear, and exact description, reference being had to the accompanying drawings, forming part of this specification, in which—

Figure 1 is a vertical sectional view of my improved boring tool taken on the line I—I of Fig. 2; and Fig. 2 is a cross section on the line II—II of Fig. 1.

Like symbols of reference indicate like parts in each figure.

My invention relates to the boring or reaming out of irregularly shaped holes in metal, and more especially to the boring of glass molds, and is designed to produce a machine which is simple in construction and can be easily changed to produce holes of any desired shape.

In the drawings, 2 represents the table for supporting the article, and 3, 3, are standards which support at their upper ends a circular flanged plate 4, having an annular shouldered recess 5, which forms a bearing for a ring 6. The press spindle 7 projects through and fits snugly within this ring, and is slotted at its lower end to receive the tool 8, which consists of a flat plate having a removable working point or end portion 9 held therein by a set-screw 10. This tool is pivoted to the spindle by a pin 11, and is provided with a longitudinal slot 12, which determines the shape of the hole to be bored. Through this slot 12 and through slots 13 in the press-spindle at right angles to the plane of the tool, passes a pin 14, which is secured at its ends in the rotatory ring 6. To prevent vibration of the spindle and guide its lower end, I preferably extend it through the plate 2, as at 15, it having a bearing therein as shown.

The operation of the device is apparent. The spindle 7 being rotated, the tool rotates with it, as does also the ring 6. As the spindle descends it forces down the tool through its pivot 11, and consequently the slot 12 passing downwardly over the relatively stationary pin 14, swings the lower end of the tool inwardly or outwardly according to the shape and direction of such slot.

The advantages of the machine are obvious, the parts being few in number and not liable to get out of order, while the shape of the hole is easily changed by changing the tool and replacing it by another with a different shaped slot.

Many variations may be made by those skilled in the art in the arrangement and construction of the parts, within the scope of the claims, since

What I claim is—

1. A boring machine consisting of a slotted spindle having a tool pivoted therein, a rotatory ring, and a pin secured in said ring and passing through a slot in the tool; substantially as described.

2. A boring machine comprising a plate having a circular recess, a ring carried therein, a spindle passing through the ring, a tool pivoted within a slot in the spindle, and a pin secured in the ring and passing through a slot in the tool; substantially as described.

3. A boring machine comprising a plate having a circular recess, a ring carried therein, a spindle passing through the ring, a tool pivoted within a slot in the spindle, and a pin passing through slots in the spindle at right angles to the plane of the tool and through a guiding slot in said tool; substantially as described.

In testimony whereof I have hereunto set my hand.

CHARLES E. BLUE.

Witnesses:
A. G. HUBBARD,
L. V. BLUE.